United States Patent
Ohnishi et al.

(10) Patent No.: US 9,659,678 B2
(45) Date of Patent: May 23, 2017

(54) METHOD FOR REMOVING CESIUM IONS FROM WATER

(75) Inventors: Noriyuki Ohnishi, Chiba (JP); Hideyuki Hata, Chiba (JP); Xiaomao Xie, Chiba (JP)

(73) Assignee: JNC Corporation, Chiyoda-ku, Tokyo (JP)

(*) Notice: Subject to any disclaimer, the term of this patent is extended or adjusted under 35 U.S.C. 154(b) by 310 days.

(21) Appl. No.: 14/233,885

(22) PCT Filed: Jul. 20, 2012

(86) PCT No.: PCT/JP2012/068514
§ 371 (c)(1),
(2), (4) Date: Apr. 17, 2014

(87) PCT Pub. No.: WO2013/012081
PCT Pub. Date: Jan. 24, 2013

(65) Prior Publication Data
US 2014/0231353 A1 Aug. 21, 2014

(30) Foreign Application Priority Data
Jul. 21, 2011 (JP) ................................ 2011-160201

(51) Int. Cl.
| G21F 9/06 | (2006.01) |
|---|---|
| G21F 9/12 | (2006.01) |
| C02F 1/42 | (2006.01) |
| C02F 1/52 | (2006.01) |
| C02F 1/58 | (2006.01) |
| B03C 1/01 | (2006.01) |
| C02F 1/48 | (2006.01) |
| C02F 101/00 | (2006.01) |
| H01F 1/44 | (2006.01) |

(52) U.S. Cl.
CPC ........... *G21F 9/06* (2013.01); *B03C 1/01* (2013.01); *G21F 9/12* (2013.01); B03C 2201/18 (2013.01); C02F 1/42 (2013.01); C02F 1/488 (2013.01); C02F 1/5236 (2013.01); C02F 2001/425 (2013.01); C02F 2101/006 (2013.01); H01F 1/44 (2013.01)

(58) Field of Classification Search
CPC ...... G12F 9/06; G12F 9/12; C02F 1/42; C02F 2001/425; C02F 1/488; C02F 1/5236; C02F 2101/006; B03C 1/01; B03C 2201/18; H01F 1/44
USPC ......................................... 210/682, 695, 723
See application file for complete search history.

(56) References Cited

U.S. PATENT DOCUMENTS

| 4,193,866 A * | 3/1980 | Slusarczuk | B03C 1/01 210/625 |
|---|---|---|---|
| 5,601,722 A | 2/1997 | Tanihara | |
| 6,046,131 A | 4/2000 | Tanihara | |
| 8,858,821 B2 * | 10/2014 | Alfadul | B03C 1/01 210/510.1 |
| 2004/0147397 A1 * | 7/2004 | Miller | B01D 15/00 502/406 |
| 2009/0038961 A1 | 2/2009 | Denton et al. | |
| 2011/0290732 A1 | 12/2011 | Pacary et al. | |

FOREIGN PATENT DOCUMENTS

| GB | 2134694 A * | 8/1984 | ............ B01D 35/06 |
|---|---|---|---|
| JP | S38-004552 | 4/1963 | |
| JP | S62-266499 A | 11/1987 | |
| JP | H05-27094 A | 2/1993 | |
| JP | H07-308590 A | 11/1995 | |
| JP | H11-76807 A | 3/1999 | |
| JP | 2005027094 A * | 1/2005 | |
| JP | 2005-177709 A | 7/2005 | |
| JP | 2013-036970 A | 2/2013 | |
| RU | 2313147 C1 * | 12/2007 | ............... G21F 9/12 |
| WO | 2010/049396 A | 5/2010 | |

OTHER PUBLICATIONS

Machine Translation of RU 2313147 CI obtained from the Espacenet Patent Search Website on Feb. 10, 2016.*
English Translation of JP2005-027094A to Matsuda et al made by FLS, Inc. for the USPTO in Dec. 2016, Translation No. 116839, 12 pages.*
Nov. 4, 2015—(JP) Notification of Reasons for Refusal—App 2013-524756—Eng Tran.
Aoki, Y. and Watara, Kazuo, "Technique to remove radioactivity in the human body—Mechanism of behavior and decontamination," Kodansha, Jan. 10, 1996, 1st edition, pp. 54-57 and 108 and the colophon—partial English translation.
Apr, 15, 2015—(EP) Supplementary Search Report—App 12814544.
International Search Report issued in corresponding International Application No. PCT/JP2012/068514 mailed Oct. 30, 2012.
Kite, Hoshasen to Josen 23 Kyuchaku deno Cesium Tokyo [Igaku Rinsho], [online], Apr. 20, 2011, [retrieval date Oct. 15, 2012], Internet <http:mainichi-benkyou.blo.s-net.ne.jp/2011-04-20>.
R.D. Ambashta et al., Journal of Magnetism and Magnetic Materials, 267, 335-340 (2003).
Documents received from the International Searching Authority received in International Application No. PCT/JP2012/068514 mailed Jul. 21, 2011.

* cited by examiner

Primary Examiner — Matthew O Savage
(74) Attorney, Agent, or Firm — Banner & Witcoff, Ltd.

(57) ABSTRACT

The present invention provides a method for efficiently separating cesium ions in a short time from an aqueous solution with the number of human working steps being reduced as much as possible and recovering the cesium ions, and an apparatus therefor.

Cesium ions in an aqueous solution are removed by preparing a cesium ion-containing magnetic particle in a cesium-containing aqueous solution and filtering or magnetically separating the magnetic particle.

5 Claims, No Drawings

METHOD FOR REMOVING CESIUM IONS FROM WATER

TECHNICAL FIELD

The present invention relates to a method for removing cesium ions in an aqueous solution. More specifically, the present invention relates to a method for removing cesium ions from water contaminated with a large amount of radioactive cesium generated in a nuclear accident or the like, and an apparatus used therefor.

BACKGROUND ART

As the method for removing cesium ions from cooling water of a nuclear power plant or polluted water in soil, which are contaminated with radioactive cesium such as $^{137}Cs$ and $^{134}Cs$, there is a method of adsorbing cesium ions onto a support that is, for example, zeolites such as mordenite, heteropolyacid salts such as ammonium phosphomolybdate, acidic salts of a polyvalent metal such as titanium phosphate, or an inorganic ion exchanger such as insoluble ferrocyanides (Patent Documents 1 and 2 and Non-Patent Document 1).

However, these supports are low in the selectivity for cesium ion and when a seawater metal ion, particularly sodium ion, is present together in the aqueous solution, the adsorption performance for cesium ion is extremely decreased, as a result, a large amount of an adsorption support is required and in turn, a large amount of radioactive waste must be treated. Also, since a support insoluble in water is used, the cesium ion adsorption reaction is inhomogeneous and a lot of time is taken to reach an adsorption equilibrium.

Also, there is a method of directly charging insoluble ferrocyanides into water contaminated with radioactive cesium to adsorb cesium ions, forming a precipitate by using a polymer flocculant, centrifugally separating the precipitate, and through filtration under reduced pressure and drying step, removing the radioactive cesium in a short time (Non-Patent Document 2).

In the method of directly charging insoluble ferrocyanides, the treatment may be performed in a short time as compared with the conventional method using a support, but a lot of time is still taken and also, automation of the process involving filtration under reduced pressure is difficult, as a result, the number of human-performed steps of treating the precipitate containing radioactive cesium concentrated to a high concentration increases, giving rise to a serious problem that the opportunity to be exposed to radiation while doing this treating work is increased.

Furthermore, in recent years, a wastewater treating system using a magnetic particle has been developed, and magnetic separation is utilized for the removal of heavy metals in an aqueous solution. Accordingly, when this method is utilized for the separation of cesium ions in an aqueous solution, cesium ions can be removed by magnetic separation without steps of centrifugation and filtration under reduced pressure and therefore, this method is supposed to be suitable for rapid removal of cesium ions with lessened exposure of human to radiation.

For example, there is a known method of previously preparing a solid adsorbent composed of a magnetic particle having bonded thereto iron ferrocyanide, charging the adsorbent into water contaminated with radioactive cesium to adsorb cesium ions, and separating the solid adsorbent to which cesium ions are adsorbed, by using a column placed in a magnetic field (Non-Patent Document 3). The method of separating the solid adsorbent and water by magnetic separation can realize separation in a short time and treatment with a relatively compact facility. However, this method requires pre-production of a magnetic particle having bonded thereto iron ferrocyanide and since also in this method, a magnetic particle insoluble in water is used as the solid adsorbent, a lot of time is taken to reach an adsorption equilibrium, making its practical use difficult.

CITATION LIST

Patent Document

Patent Document 1: JP H7-308590A
Patent Document 2: JP H11-76807A

Non-Patent Document

Non-Patent Document 1: Journal of Environmental Radioactivity 100 (2009) 914-920
Non-Patent Document 2: Journal of Radioanalytical and Nuclear Chemistry, Vol. 258, No. 3 (2003) 457-462
Non-Patent Document 3: Journal of Magnetism and Magnetic Materials 267 (2003) 335-340

SUMMARY OF INVENTION

Technical Problem

Accordingly, an object of the present invention is to provide a method for efficiently separating cesium ions in a short time from an aqueous solution with the number of human working steps being reduced as much as possible and recovering the cesium ions, and an apparatus therefor.

Means for Solving the Problems

As a result of intensive studies to attain the above-described object, the present inventors have found a method for homogeneously removing cesium ions in a short time from an aqueous solution. That is, the present invention has been accomplished by the following configurations.

[1] A method for removing cesium ions in an aqueous solution, comprising preparing a cesium ion-containing magnetic particle in a cesium-containing aqueous solution and magnetically separating the magnetic particle.

[2] A method for removing cesium ions in an aqueous solution, comprising preparing a cesium ion-containing magnetic particle in a cesium-containing aqueous solution and filtering or magnetically separating the magnetic particle.

[3] The method for removing cesium ions described in the above [1] or [2], wherein the cesium ion-containing magnetic particle is prepared after homogeneously reacting cesium ions and a cesium ion-adsorbing substance.

[4] The method for removing cesium ions described in the above [1] or [2], wherein the cesium ion-containing magnetic particle is prepared by adding a water-soluble ferrocyanide and a water-soluble iron salt to the cesium-containing aqueous solution.

[5] The method for removing cesium ions described in the above [4], wherein the water-soluble ferrocyanide is potassium ferrocyanide or sodium ferrocyanide and the water-soluble iron salt is iron chloride, iron sulfate or iron nitrate.

[6] The method for removing cesium ions described in the above [5], wherein the water-soluble iron salt is a mixture of ferrous chloride and ferric chloride.

[7] The method for removing cesium ions described in the above any one of the above [1] to [6], wherein after the preparation of the magnetic particle, filtration or magnetic separation is performed by adding a flocculant to the cesium-containing aqueous solution.

[8] The method for removing cesium ions described in the above any one of the above [1] to [6], wherein cesium ions in the cesium-containing aqueous solution are removed within 60 minutes in total of the magnetic fine particle preparation step and the filtration or magnetic separation step.

[9] A removal apparatus for performing the removal of cesium ions in a cesium-containing aqueous solution described in the above any one of the above [1] to [8], comprising a tank for preparing a cesium ion-containing magnetic particle, wherein the tank is equipped with a function for automatically performing filtration or magnetic separation of the magnetic particle.

Advantageous Effect of the Invention

In the present invention, a water-insoluble substance having a cesium ion adsorption capacity (for example, a support such as zeolite, an insoluble ferrocyanide, or a magnetic particle containing such a material) is added to a cesium-containing aqueous solution so as to not only adsorb/separate cesium ions but also prepare a magnetic particle in the presence of a compound having a cesium ion adsorption capacity in the cesium-containing aqueous solution, whereby a magnetic particle having homogeneously, rapidly and efficiently absorbed thereinto cesium ions can be produced and separated. By filtering or magnetically separating the thus-obtained cesium ion-containing magnetic particle, cesium ions can be easily and efficiently separated and recovered from the aqueous solution.

According to the present invention, cesium ions in an aqueous solution can be simply removed in a short time of 60 minutes or less with excellent cesium removal efficiency.

Furthermore, according to the present invention, the steps such as centrifugation and filtration under reduced pressure, which have been conventionally required, can be simplified by general-purpose filtration or magnetic separation step, so that the cesium removal process can be automated. As a result, exposure of human to radiation can be minimized, and this is very valuable as a technique for treating radioactive cesium. Also, the volume of the cesium ion-containing magnetic particle recovered is very small as compared with that in the method of adsorbing cesium ions by a water-insoluble adsorption support such as zeolite, and the amount of radioactive waste can be greatly reduced.

In Non-Patent Document 3, adsorption of radioactive cesium ions is tried by using a magnetic fine particle having fixed therein iron ferrocyanide, but the adsorption reaction is inhomogeneous and therefore, a treatment time of 10 hours or more is required.

In addition, according to the present invention, a preliminary operation of, for example, previously loading iron ferrocyanide on a support to produce an adsorbent is not necessary and moreover, the produced magnetic particle can be easily separated as a low-water-content waste by filtration or magnetic separation, leading to reduction in the waste.

DESCRIPTION OF EMBODIMENTS

The method for removing cesium ions in an aqueous solution of the present invention is a method comprising preparing a cesium ion-containing magnetic particle in a cesium-containing aqueous solution and filtering or magnetically separating the magnetic particle.

In the present invention, as long as a cesium ion-containing magnetic particle where cesium ions are adsorbed to or absorbed into a magnetic particle in the production process of the magnetic particle can be prepared by producing a magnetic particle in a cesium-containing aqueous solution, any production method may be used. For example, a magnetic particle is produced in a cesium-containing aqueous solution in the presence of a compound having a cesium ion absorption capacity, whereby a cesium ion-containing magnetic particle can be prepared. The cesium-containing aqueous solution is an aqueous solution where cesium is dissolved in the ion state. Incidentally, the cesium-containing aqueous solution may be subjected to a pretreatment such as oil-water separation, filtration and pH adjustment, if desired.

The compound having a cesium ion adsorption capacity is preferably water-soluble, and a water-soluble ferrocyanide is preferably used. The water-soluble ferrocyanide is preferably a salt containing an alkali metal or a nitrogen compound, and examples thereof include sodium salt, potassium salt and ammonium salt. Among others, potassium ferrocyanide and sodium ferrocyanide are preferred. As for the amount added to the cesium-containing aqueous solution, the water-soluble ferrocyanide is preferably added in a required amount that is equimolar to or greater than the amount of cesium ions in the aqueous solution. In order to adsorb cesium ions in a short time, the amount of the ferrocyanide added is preferably set large to thereby obtain a high removal ratio even when the cesium ion concentration is low. The amount added is preferably set after the range of cesium ion concentration in the cesium-containing aqueous solution as a target object of removal and the amount of the water-soluble ferrocyanide required to achieve the target removal ratio are confirmed by a preliminary test.

The method for producing a magnetic particle in the aqueous solution is not particularly limited, and a known method may be appropriately used. The magnetic particle prepared in the aqueous solution includes magnetic particles of magnetite, nickel oxide, ferrite, cobalt iron oxide, barium ferrite, carbon steel, tungsten steel, KS steel, rare earth cobalt magnet, hematite and the like.

For example, in a cesium-containing aqueous solution, an aqueous iron salt is added in the presence of the above-described water-soluble ferrocyanide, whereby a cesium ion-containing magnetic particle can be prepared in the aqueous solution. In the process of preparing such a magnetic particle, it is presumed that the ferrocyanide reacts with the water-soluble iron salt while reacting with the cesium ion and a cesium ion-containing magnetic particle is thereby obtained. At the same time, it has been found that by passing through such a preparation step, cesium ions are very efficiently adsorbed to or absorbed into the magnetic particle in a short time.

As the water-soluble iron salt, iron chloride, iron sulfate or iron nitrate can be used. The water-soluble iron salt is preferably a mixture of divalent and trivalent water-soluble iron salts, and among these, a mixture of ferrous chloride and ferric chloride is preferred.

Furthermore, in order to prepare the magnetic particle efficiently, an alkali is preferably added to the aqueous solution. The timing of addition thereof is not limited but is preferably after the compound having a cesium ion adsorption capacity and a raw material compound for producing the magnetic particle are added to the aqueous solution. The alkali is not particularly limited as long as it assists in forming the magnetic particle, but in view of profitability and handleability, sodium hydroxide, aqueous ammonia, urea and the like may be used. The pH in preparing the magnetic particle is preferably 10 or more.

The obtained magnetic particle may be allowed as it is to precipitate/aggregate and be separated, but by performing filtration or magnetic separation, the magnetic particle can be rapidly and efficiently recovered. The magnetic separation may use a conventionally known method such as permanent magnet, electromagnet, super-conducting magnet and magnetic column, and for minimizing the effect of a radioactive substance on human, it is preferred to establish automation without involving human work.

The filtration can be performed by a conventionally known method using a known filter such as industrial filter paper, membrane filter, hollow filter, cartridge filter, glass filter paper and filtration plate, and similarly to the magnetic separation, it is preferred for minimizing the effect of a radioactive substance on human to establish automation without involving human work. The pore size of the filter is not particularly limited but is preferably 0.2 μm or more from the standpoint of increasing the filtration rate and preventing clogging. The upper limit is not particularly limited but is preferably 1 μm or less from the standpoint of preventing a recovery failure at the filtration of the produced magnetic fine particle.

Furthermore, in order to increase the filtration or magnetic separation rate, a polymer flocculant may be added after the preparation of the magnetic particle. The polymer flocculant is not particularly limited as long as it is a flocculant capable of aggregating the produced magnetic particle, but, for example, a polyanionic polymer flocculant such as polyacrylic acid can be used.

The cesium ion concentration of the cesium-containing aqueous solution to which the method of the present invention can be applied is not particularly limited, but the method can be applied to a cesium-containing aqueous solution at a wide cesium ion concentration ranging from 1,000 ppm to 1 ppm. Incidentally, the cesium ion concentration (ppm) as used in the present invention indicates a weight concentration ((weight of cesium ion)/(volume of aqueous solution)).

As long as the magnetic particle can be filtered or magnetically separated, the particle size is also not particularly prepared, but the magnetic particle is preferably prepared to have a particle diameter of 1 to 400 μm.

Furthermore, in the method of the present invention, the temperature and treatment time in each of the step of preparing the cesium ion-containing magnetic particle and the step of filtering or magnetically separating the magnetic particle are not particularly limited, but the step can be performed at a temperature of 20 to 100° C., preferably from 50 to 70° C. Although this may vary depending on the concentration of cesium-containing aqueous solution applied, the magnetic force of magnet used for magnetic separation or the performance of filter used for filtration, when the method of the present invention is applied, the treatment time in the magnetic particle preparation step can be 45 minutes or less, preferably on the order of 5 to 30 minutes, and thus, can be greatly shortened as compared with the conventional method. Even when the filtration or magnetic separation step is combined, cesium ions can be separated/removed in 60 minutes or less, preferably on the order of 10 to 35 minutes.

The operation at the temperature above for producing a magnetic particle after introducing the cesium-containing aqueous solution into a magnetic particle preparation tank may be performed before addition of a ferrocyanide, a metal salt and an alkali, may be performed during addition of a ferrocyanide, a metal salt and an alkali, or may be performed after addition of a ferrocyanide, a metal salt and an alkali.

The reaction solution containing the produced magnetic particle may be separated by a separation operation such as centrifugation but can be more rapidly and efficiently separated and recovered by using filtration or magnetic separation. The operation of magnetic separation can be performed by a known method or apparatus for separating a magnetic particle from a reaction solution by using a permanent magnet, an electromagnet, a super-conducting magnet or the like.

The cesium ion removal ratio is from 97 to 99.9%, and a cesium ion treatment efficiency higher than the conventional treatment efficiency can be achieved. Also, the volume of the precipitate recovered may vary depending on the cesium ion concentration but is approximately somewhat over the amount used of the magnetic particle using a water-soluble ferrocyanide and a water-soluble iron salt, and thus, the volume of waste can be by far smaller than the volume of the precipitate obtained in the conventional removal method.

Furthermore, according to the present invention, the magnetic particle preparation tank is equipped with a function for automatically filtering or magnetically separating the magnetic particle after a high-concentration cesium-containing aqueous solution is introduced into the tank and a cesium ion-containing magnetic particle is prepared by the method above, so that the cesium ion-containing magnetic particle can be efficiently and automatically recovered and discarded. In addition, the treatment apparatus is preferably designed such that the aqueous solution after recovering the magnetic particle is reutilized in the magnetic particle preparation step.

Specifically, examples of the method therefor include a method where the reaction solution containing the produced magnetic particle is cause to undergo aggregation by a magnet placed outside the magnetic particle preparation tank and after the reaction solution is held in the preparation tank and then discharged, the magnetic particle is recovered by removing the magnet, a method where a magnet is placed in the preparation tank to magnetically gather magnetic particles on the surface thereof and after separating the reaction solution, the magnetically gathered magnetic particles are scraped off from the magnet surface and recovered, and a method where the reaction solution is passed through a magnetic column placed in a magnetic field to magnetically gather magnetic particles in the magnetic column and thereafter, the magnetic particles are recovered by removing the magnetic field.

EXAMPLES

The present invention is described in greater detail below by referring to Examples, but the present invention is not limited thereto.

Incidentally, the measurement of cesium ion concentration by atomic absorption photometry was performed at a measurement wavelength of 852.1 nm by using a flame atomic absorption photometer, "Z-2300", manufactured by Hitachi High-Technologies Corporation.

Also, water used in the present invention is purified water having an electrical conductivity of 14.7 MΩcm purified by a pure water production apparatus, "Elix UV 35", manufactured by Millipore Corporation.

Example 1

In a 100-ml three-neck flask, 1 ml of an aqueous cesium chloride solution (concentration: 20 mg/ml) and 20 ml of an aqueous potassium ferrocyanide trihydrate solution (concentration: 50 mg/ml) were added and stirred at a rotation speed of 250 rpm for 5 minutes at room temperature. Furthermore, 40 ml of an aqueous ferric chloride hexahydrate solution (concentration: 50 mg/ml) was added and stirred for 30 minutes. After adding 15 ml of an aqueous ferrous chloride tetrahydrate solution (concentration: 50 mg/ml), the flask was heated in a water bath while continuing the stirring. When the liquid temperature reached 60° C., 3 ml of an aqueous 28 wt % ammonia solution was added, and stirring was continued at 60° C. for 10 minutes. Thereafter, stirring was stopped, and the produced magnetic particle was recovered by a neodymium magnet of 4000 G. The supernatant after the recovery of magnetic particle was collected, and the cesium ion concentrations before and after the reaction were measured by atomic absorption photometry. As a result, the cesium ion concentration of the supernatant after the recovery of magnetic particle was reduced to 5 ppm or less from the cesium ion concentration (200 ppm) before reaction, and 97% or more of cesium ion was recovered on the magnetic particle side.

Example 2

A 100-ml three-neck flask was charged with 68 ml of an aqueous 10 vol % seawater solution and subsequently, 1 ml of cesium chloride (concentration: 20 mg/ml) and 2 ml of an aqueous potassium ferrocyanide trihydrate solution (concentration: 100 mg/ml) were added and stirred at a rotation speed of 250 rpm for 5 minutes at room temperature. Furthermore, an aqueous ferric chloride hexahydrate solution (87 mg/ml) and an aqueous ferrous chloride tetrahydrate solution (32 mg/ml) each in an amount of 2.5 ml were added to the flask, and the flask was heated in a water bath until the liquid temperature reached 50° C. When the liquid temperature reached 50° C., 2 ml of an aqueous 28 wt % ammonia solution was added, and stirring was continued at 50° C. for 10 minutes. Thereafter, stirring was stopped, and the produced magnetic particle was recovered by a neodymium magnet of 4000 G. The supernatant after the recovery of magnetic particle was collected, and the cesium ion concentrations before and after the reaction were measured by atomic absorption photometry. As a result, the cesium ion concentration of the supernatant after the recovery of magnetic particle was reduced to 5 ppm or less from the cesium ion concentration (200 ppm) before reaction, and 97% or more of cesium ion was recovered on the magnetic particle side.

Example 3

The cesium ion concentrations before and after the reaction were measured in the same manner as in Example 2 except that in Example 2, the amount added of the aqueous potassium ferrocyanide trihydrate solution was changed to 1 ml and each of the amounts added of the aqueous ferric chloride hexahydrate solution (87 mg/ml) and the aqueous ferrous chloride tetrahydrate solution (32 mg/ml) was changed to 1.5 ml. As a result, the cesium ion concentration of the supernatant after the recovery of magnetic particle was reduced to 5 ppm or less from the cesium ion concentration (200 ppm) before reaction, and 97% or more of cesium ion was recovered on the magnetic particle side. At this time, the weight of the magnetic particle recovered was 150 mg.

Comparative Example 1

A 50-ml sample tube was charged with 390 mg of pulverized natural hard zeolite (NS-IZK-ZEOLITE, produced by NEW STONE) and furthermore, 39 ml of an aqueous cesium-containing 10 vol % seawater solution prepared by adding 10 ml of cesium chloride (concentration: 20 mg/ml) to 78 ml of seawater and 692 ml of water was charged into the sample tube and stirred by a rotary shaker for 5 minutes, 30 minutes, 1 hour, 4 hours and 24 hours. After separating the zeolite by centrifugation (10,000 rpm, 2 minutes), the supernatant was collected, and the cesium ion concentrations before and after the reaction were measured by atomic absorption photometry. As a result, 70%, 84%, 88%, 89% and 95% of cesium was recovered after 5 minutes, 30 minutes, 1 hour, 4 hours and 24 hours, respectively, and it was confirmed that even when the adsorption operation is continued for 24 hours, 5% of cesium remains.

This application is based on Japanese application No. 2011-160201, filed on Jul. 21, 2011, the entire contents of which are incorporated hereinto by reference.

INDUSTRIAL APPLICABILITY

The method and apparatus of the present invention can effectively remove/recover cesium ions in an aqueous solution and are suitable particularly as a technique for removing cesium ions from water contaminated with radioactive cesium such as $^{137}Cs$ and $^{134}Cs$.

The invention claimed is:

1. A method for removing cesium ions in an aqueous solution, comprising:

adding an aqueous solution of a substance having a cesium ion adsorption capacity to a cesium-containing aqueous solution, the aqueous solution of the substance having a cesium ion adsorption capacity comprising a dissolved water-soluble ferrocyanide, a dissolved water-soluble iron salt, and an alkali; while maintaining a temperature of 20 to 100° C.; whereby cesium ions are adsorbed by the substance to form a cesium ion-containing magnetic particle; and (i) magnetically separating the magnetic particle from the aqueous solution; or (ii) passing the aqueous solution through a filter to separate the magnetic particle from the aqueous solution.

2. The method for removing cesium ions according to claim 1, wherein the water-soluble ferrocyanide is potassium ferrocyanide or sodium ferrocyanide and the water-soluble iron salt is iron chloride, iron sulfate or iron nitrate.

3. The method for removing cesium ions according to claim 1, wherein the water-soluble iron salt is a mixture of ferrous chloride and ferric chloride.

4. The method for removing cesium ions according to claim 1, further comprising:

adding a flocculant to the cesium-containing aqueous solution.

5. The method for removing cesium ions according to claim 1, wherein the steps of adding the aqueous solution of the substance having a cesium ion adsorption capacity to the cesium-containing aqueous solution and separating the magnetic particle from the aqueous solution are performed within a total of 60 minutes.

* * * * *